United States Patent [19]
Sanford et al.

[11] 3,713,139
[45] Jan. 23, 1973

[54] APPARATUS AND METHOD OF DETERMINING DISPLACEMENTS

[75] Inventors: Norman R. Sanford; Juris Vikmanis, both of Dayton, Ohio

[73] Assignee: The Bendix Corporation

[22] Filed: Jan. 25, 1971

[21] Appl. No.: 109,345

[52] U.S. Cl..........340/347 P, 235/92 GC, 250/237 G
[51] Int. Cl. ...............................................G08c 9/06
[58] Field of Search.340/347 AD, 347 P; 250/237 G; 235/92 GC

[56] References Cited

UNITED STATES PATENTS

| | | | |
|---|---|---|---|
| 3,588,462 | 6/1971 | Kreckel | 235/92 GC |
| 3,571,575 | 3/1971 | Barr | 235/92 GC |
| 3,142,121 | 7/1964 | Stefanov | 235/92 GC |
| 3,371,335 | 2/1968 | Seewald | 235/92 GC |
| 3,394,248 | 7/1968 | Ogden | 235/92 GC |
| 3,549,870 | 12/1970 | Lay | 235/92 GC |
| 3,551,657 | 12/1970 | Darrington | 235/92 GC |

*Primary Examiner*—Maynard R. Wilbur
*Assistant Examiner*—Jeremiah Glassman
*Attorney*—Candor, Candor & Tassone and Plante, Hartz, Smith and Thompson

[57] ABSTRACT

A fixed member and a movable member are provided together with means for providing a cyclic wave pattern upon moving the movable member relative to the fixed member. The direction and precise extent of movement are determined by observing the pattern and the extent is indicated as a digital readout. Comparatively inexpensive components are used to determine and indicate the major portion of the digital readout. Logic means is employed for determining at least one digit, such as the least significant digit, of the readout using electrical signals in a substantially static condition whereby such digit is determined absolutely and independently of any previous movement of the movable member.

17 Claims, 3 Drawing Figures

INVENTORS
NORMAN R. SANFORD
JURIS VIKMANIS
BY
Candor, Candor & Tassone
THEIR ATTORNEYS

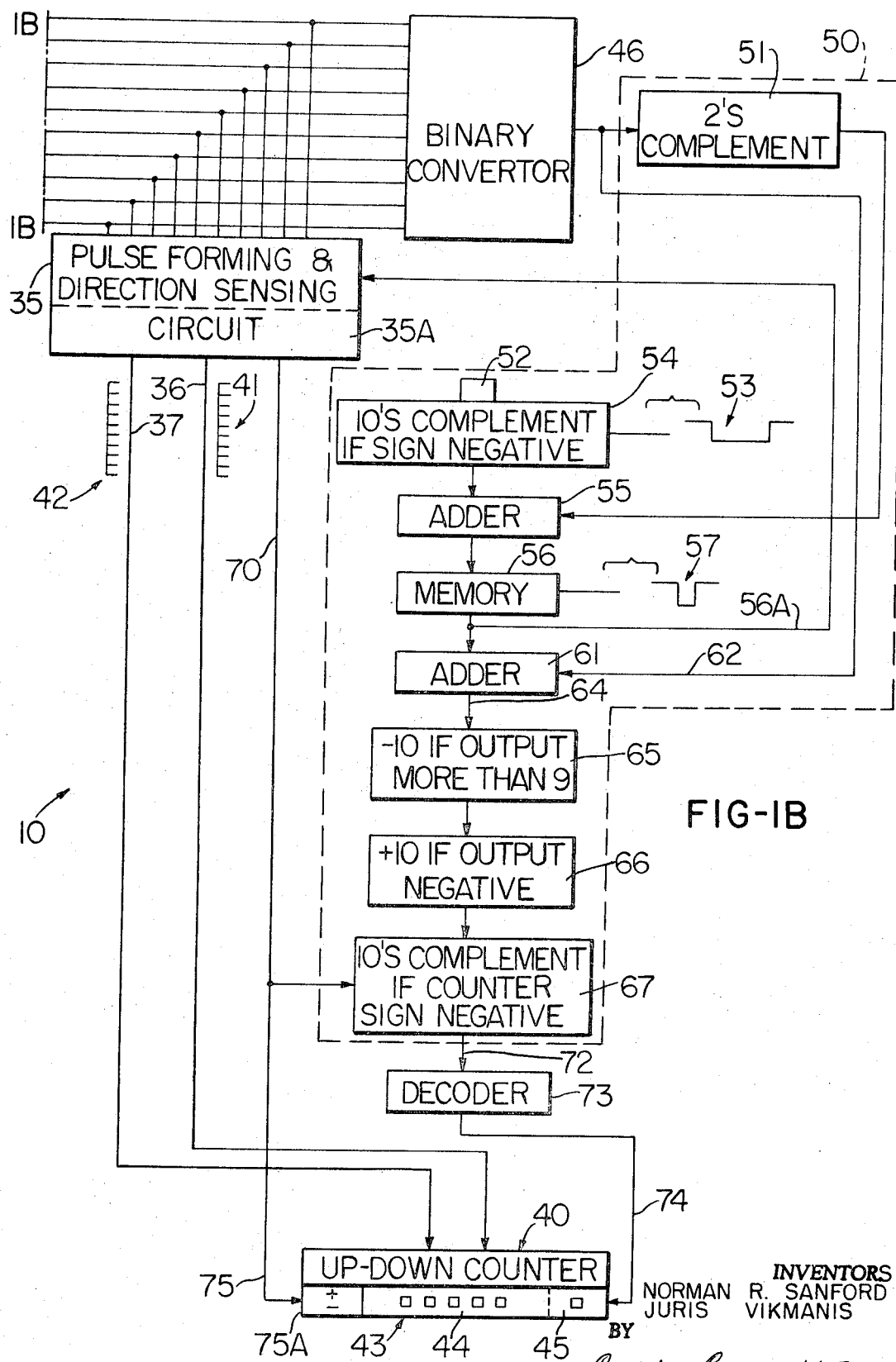

APPARATUS AND METHOD OF DETERMINING DISPLACEMENTS

BACKGROUND OF THE INVENTION

There are numerous apparatus and methods in current use for determining displacements such as the displacement of a movable member with respect to a fixed member. In an effort to determine displacements with greater accuracies it has been standard practice to upgrade the entire system and provide complicated and expensive devices for determining and indicating such displacements over the full range of travel of the movable member relative to its associated fixed member.

For example, with previous apparatus of this type using the moire fringe principle, it has been necessary to provide the members as gratings having a comparatively large number (2,500 or more) of grating lines per inch in order to provide greater accuracy. Accordingly, it has been necessary to provide greater electrooptical systems of optimum precision and high speed electronic counters; however, these electrooptical systems and counters are expensive to maintain in top operating condition, tend to introduce errors if the associated machined is subject to vibration, and often provide improper counting by missing electrical pulses when moving the movable member at moderate operating speeds.

As a practical matter, in a measuring machine, for example, it is not necessary to determine movement of a movable member with respect to an associated fixed member with great precision at every transient position along its entire range of travel. It is only necessary to determine the precise position of the movable member with great accuracy at each final position where it is desired to obtain a dimensional measurement.

SUMMARY

This invention provides an improved apparatus for and method of determining displacements wherein a fixed member and a movable member are provided together with means for providing a cyclic wave pattern upon moving the movable member relative to the fixed member. The direction and precise extent of movement are determined by observing the pattern and the extent is indicated as a digital readout. Comparatively inexpensive components are used to determine and indicate the major portion of the digital readout. Logic means is employed for determining at least one digit, such as the least significant digit, of the readout using electrical signals in a substantially static condition whereby such digit is determined absolutely and independently of any previous movement of the movable member.

Other details, uses, and advantages of this invention will be readily apparent from the exemplary embodiment thereof presented in the following specification, claims, and drawings.

BRIEF DESCRIPTION OF THE DRAWINGS

The accompanying drawings show a present exemplary embodiment of this invention, in which FIGS. 1A and 1B illustrate one exemplary embodiment of the apparatus and method of this invention with certain component parts shown perspectively and other parts shown schematically upon aligning FIGS. 1A and 1B along their respective break lines 1A—1A and 1B—1B; and FIG. 2 presents the phase relationship of electrical signals defined within an interpolator comprising the system of FIGS. 1A and 1B.

DESCRIPTION OF ILLUSTRATED EMBODIMENT

Figures 1A, 2:
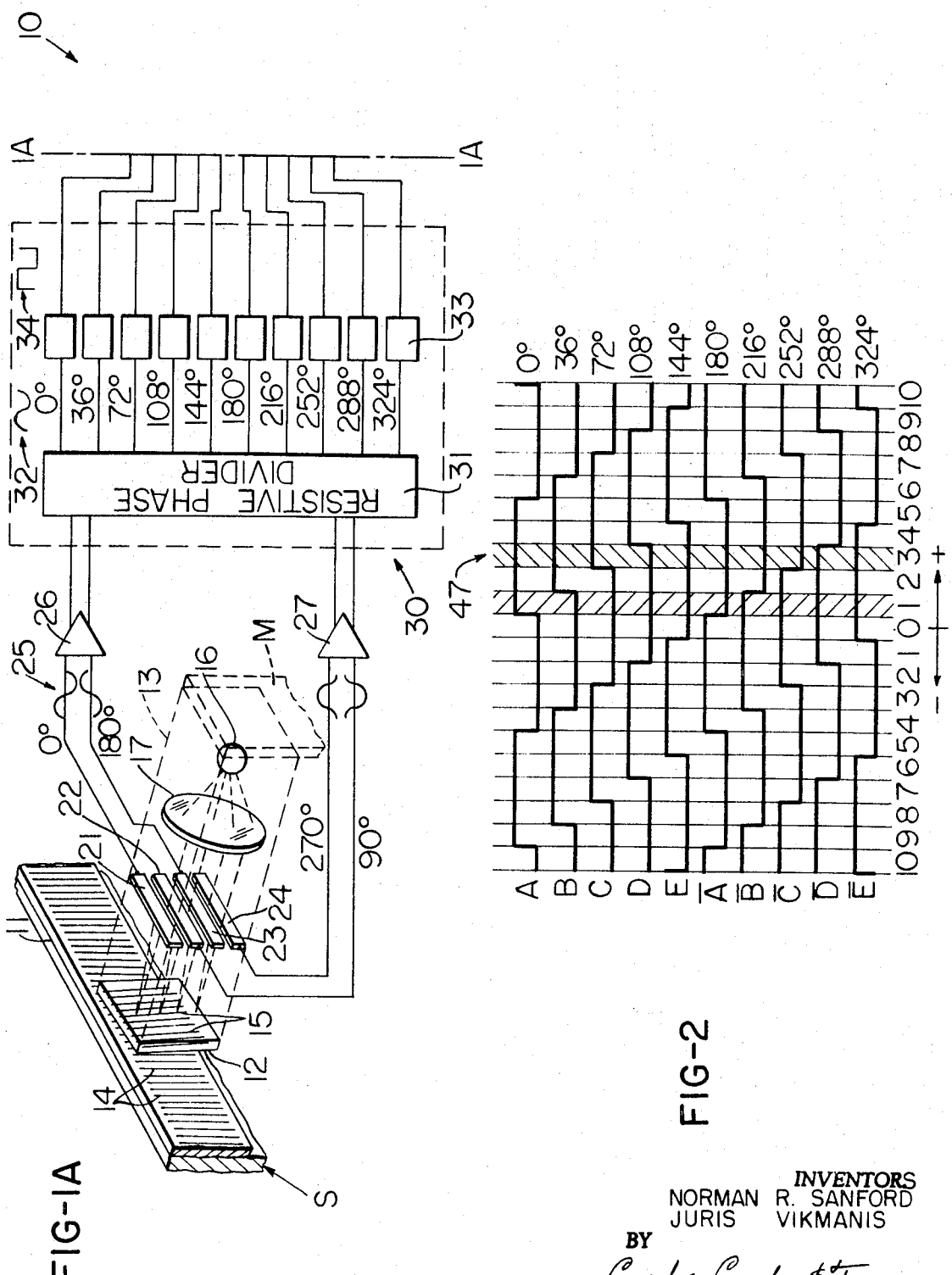

Reference is now made to FIGS. 1A and 1B of the drawings which illustrate one exemplary embodiment of the apparatus and method of this invention which is designated generally by the reference numeral 10. The apparatus 10 comprises a fixed member in the form of a reflective scale grating 11 which may be fixed on a support of an associated machine and a member in the form of an index grating 12 attached in a fixed manner on a reading head 13 which is supported for precise movement relative to the scale grating whereby the index grating 12 is movable in a precise manner relative to the scale grating 11. The members or gratings 11 and 12 have means for providing a cyclic wave pattern upon moving the movable grating 12 relative to the fixed grating 11 as will now be described in detail.

The scale grating 11 has an outer reflective surface which has a plurality of grating lines 14 suitably provided thereon and the lines are arranged in parallel equally spaced relation. The index grating 12 is made of a material capable of transmitting light therethrough and has a plurality of grating lines 15 provided on its outside surface, i.e., the surface closely adjacent the outside surface of the scale grating 11, and the lines 15 are also arranged in parallel equally spaced relation with the distance between lines 15 being identical to the distance between the grating lines 14 on the scale grating 11. The space or area between the grating lines 15 is clear enabling light to be easily transmitted therethrough whereby the lines 15 on the index grating cooperate with the lines 14 on the scale grating to produce a light interference pattern in a manner known in the art and, thus, produce a cyclic moire fringe pattern which is often popularly referred to as simply a moire fringe.

The manner in which a moire fringe pattern is produced is well known; further, the appearance and general arrangement thereof with respect to the cooperating grating lines which produce such a pattern are also known. Therefore, for simplicity, a detailed showing of such a pattern will not be presented in the drawings, because such a showing is not necessary to the understanding of this invention.

The reading head 13 has a light source 16 and collimating lens 17 which cooperate to direct light toward and through the index grating 12. When the index grating 12 is superimposed on the scale grating 11 with its grating lines 15 at a slight angle with respect to the grating lines 14 on the scale grating, a moire fringe pattern results from the integrated interference effect caused by the intersection of the individual lines on the two gratings. As the index grating 12 is moved along the longitudinal axis of the scale grating 11, the moire fringe pattern shifts laterally and continuously across the grating path, with the direction of shift being a function of the direction of motion of the index grating 12 relative to the fixed scale grating 11. The pattern assumes a cyclic distribution of light intensity in the direction of shift, with the number of cycles being a function of the angle between the two gratings and with the light intensity variation being approximately sinusoidal. The number of cyclic distributions of light intensity across the grating width is a function of the angle (popularly referred to as the skew angle) between the lines on the two gratings with the correct angle being that angle which results in only one light and dark cycle or shadow pattern appearing across the viewing area at any one instant.

The index grating 12 is adjustably attached on the reading head so that its grating lines 15 may be adjustably inclined to change the skew angle between grating lines 14 and 15. The reading head 13 also has a plurality of four photoelectric devices 21, 22, 23 and 24 which are positioned so as to view the moving fringe pattern at four locations. The devices 21-24 have voltage outputs which are proportional to the light intensity incident to each cell and such outputs are roughly sinusoidal and due to the placement of devices 21-24 such outputs are related in phase by 0°, 90°, 180°, and 270° respectively, as seen at 25 in FIG. 1A.

The output signals from the photoelectric devices 21-24 are amplified using a pair of differential amplifiers 26 and 27. In particular, the output signals from devices 21 and 23 (the 0° and 180° output signals) are fed to the amplifier 26; and, the output signals from devices 22 and 24 (the 90° and 270° output signals) are fed to the amplifier 27.

The output of each amplifier 26 and 27 is proportional to the difference between its respective antiphase inputs and this method of amplifying the signals eliminates, to a large degree, electrical disturbances due to slight imperfections in the grating pattern as well as electrical noise pickup, since differential amplifiers have inherently high common mode signal rejection. The amplified signals are then used to determine the major portion of the amount or distance that the index grating 12 is moved or displaced along the scale grating 11 from any reference point and the direction of such displacement.

The apparatus 10 includes an electrical interpolator 30 which is shown by dotted lines in FIG. 1A and the interpolator 30 receives sinusoidal output signals from the differential amplifiers 26 and 27. The interpolator 30 employs a conventional resistive phase divider 31 which provides 10 sinusoidal signals therefrom having a wave form as indicated at 32 and such interpolator is popularly referred to as a divide-by-10 interpolator. The 10 signals are displaced by 36° from each other and are indicated by lines designated 0°, 36°, 72°, 108°, etc., through 324° and back to 0°. Each of the sinusoidal signals is fed to a zero crossing detector and trigger device which may be in the form of a Schmitt trigger, or the like, whereby each device 33 converts a sinusoidal input thereto to a square or rectangular wave form essentially as shown at 34.

The outputs from the devices 33 have phase relationships and wave forms as shown in FIG. 2 of the drawings for each of the signals whereby further description thereof is considered unnecessary. For convenience and easy reference thereto, the wave forms at 0°, 36°, 72°, 108° and 144° are also designated by the reference letters A, B, C, D and E respectively. Similarly, the wave forms at 180°, 216°, 252°, 288° and 324° are designated by the reference letters $\overline{A}, \overline{B}, \overline{C}, \overline{D}$ and $\overline{E}$ respectively.

The so-called square wave signals from the devices 33 are provided to an electrical circuit 35 (see (FIG. 1B) which includes a pulse-forming and direction-sensing circuit of standard construction. The circuit 35 provides outputs through channels 36 and 37 to a standard up-down electronic counter 40 which operates in a known manner so that with movement of the movable index grating 12 relative to the fixed scale grating 11 in one direction the output from the photoelectric device 21 (arranged at 0°) leads the sinusoidal output from the photoelectric device 22 (arranged at 90°), causing discrete electrical pulses indicated at 41 to flow through channel 36 and causing the counter to count up, or add, pulses. If movement of the index grating 12 along the scale grating 11 is in a direction opposite from the one direction, the output from the photoelectric device 21 (arranged at 0°) lags the output from the photoelectric device 22, causing discrete pulses indicated at 42 to flow through channel 37 and causing the counter to count down, or subtract, pulses. The construction and operation of the circuit 35 and associated counter 40 is well known; hence, a further detailed description thereof will not be presented because it is considered unnecessary.

The up-down counter 40 is operatively connected to a suitable display or digital readout unit 43 and a main reading is suitably displayed on a central portion 44 of the readout unit 43. The main reading or main portion of the signal may be provided using only two or three signals, two of which have a sine-cosine relationship and using associated comparatively inexpensive components. For example, in the case of a moire fringe system the gratings 11 and 12 may have 1,000 grating lines per inch and be of inexpensive construction whereby accuracies of ± 0.001 are readily obtained.

However, in many applications of machine tools, measuring machines or the like, it is necessary to determine displacements of a pair of relatively movable members to accuracies greater than ± 0.001 inch. The apparatus and method of this invention enables a comparatively inexpensive provision of one or more digits of a reading which may be displayed on the digital readout unit 43; and, in this example, the least significant digit of a reading is determined in an absolute manner and displayed on portion 45 of the display unit 43.

The least significant digit of the reading of this example is determined logically by observing the wave forms from the interpolator 30 while such wave forms are in a substantially static condition which will occur at each position at which the grating 12 is stopped. In addition, binary mathematic techniques, together with conventional electrical components which lend themselves to use in binary systems, are used to provide an absolute value for the least significant digit without concern for the past history of input pulses. For example, with the system of this invention, the least significant digit would always be accurately determined even if electrical power to the associated machine were to be turned off and then on again.

The apparatus 10 employs a binary conversion circuit 46 which converts each possible square wave input combination to a useable positive number and a corresponding electrical signal capable of being used. Thus, referring to the wave forms illustrated in FIG. 2 an exemplary condition wherein wave forms A, B, C, $\overline{D}$ and $\overline{E}$ on the positive side of zero are all at a high value would carry a designation of a positive 3, see the lightly cross-hatched area at 47 in FIG. 2. A condition wherein the wave forms A, $\overline{B}$, $\overline{C}$, $\overline{D}$ and $\overline{E}$ on the positive side of zero are at a high value would carry a designation of a positive 1, etc., until all desired and/or possible combinations of wave forms are taken into consideration whereby each particular combination would represent a particular dimensional value or condition and could be displayed directly on portion 45 of the readout unit 43.

However, in any working system it is necessary, as a practical matter, to provide an apparatus such as the apparatus 10 with means for presetting a particular value on the readout unit and in this example such preset means is shown by a dotted block 50. The preset means or system 50 enables any desired value to be preset on unit 43 (while taking into account the static wave condition) including presetting the value of "0" on such unit whereupon the preset system inherently includes reset means as an integral part thereof.

The preset system 50 includes a conventional electrical circuit 51 which takes the 2's complement of the output from the binary convertor 46 to convert such output to a negative number.

A negative number is used to simplify later addition to a desired number which is to be preset into the system to obtain the difference between the output from convertor 46 and the preset into the system.

The preset is in the form of a number which is displayed on the unit 43 and is introduced mechanically in the system using any suitable technique such as a mechanical thumb wheel assembly and associated electrical components indicated schematically by a block diagram 52. The effect of mechanically entering a preset in the system is to simultaneously introduce a precision electrical signal having a particular wave form as shown at 53, and, hence a particular value and operating effect on the signal from the convertor 46, with which it is later combined.

The preset system 50 of apparatus 10 also has an electrical circuit 54 for taking the 10's complement in those instances where it is desired to preset a negative number into the system and this is necessary because the static wave forms, as illustrated in FIG. 2 of the drawings, are not symmetrical with respect to zero, i.e., a central vertical axis through zero. The 10's complement, in essence, serves to make any negative number which is to be preset correspond to the wave form of the positive number sequences illustrated in FIG. 2 and is required for proper later decoding.

The system 50 employs an adder circuit 55 to add the preset from the circuit 54 and the negative input from the 2's complement circuit 51 and the adder circuit 55 obtains the difference between the inputs from circuits 51 and 54. This difference represents a constant correction which is provided to a storage or memory circuit 56 which is often popularly referred to as a latch. An electrical signal having the wave form as shown at 57 is used to enter the constant correction into the memory circuit 56. This correction is the value which must be added to the signal from the circuit 46 to achieve the specified preset (or reset when the preset is 0) for the particular location at which the movable member or index grating 12 is located with respect to fixed grating 11. The memory circuit 56 provides this constant correction or electrical signal 57 until a new value is introduced into the preset system by assembly 52 and the coincidence of the electrical signal 57.

To highlight the operation of the preset system 50 assume, for example, that the desired preset number is 5 and the initial input from the circuit 46 is +3. Then the preset input to the adder 55 would be 5 and the 2's complement input from circuit 51 would be a −3 whereby 5+ (−3) equals 2, which is the output from the adder 55. This output of 2 from the adder 55 is provided to the circuit 56 and circuit 56 always adds 2 to any input from circuit 46. It will also be appreciated that this value of 5 would appear on portion 45 of the readout unit 43.

The apparatus 10 also has an adder circuit 61 which serves to add the correction constant from the memory 56 to each input signal through line 62 from the circuit 46 to provide an output through an output channel or line 64. However, the signal through the line 64 may be such that it corresponds to a numerical value of more than 9 or such signal may have a negative sign whereupon in the former instance a circuit 65 is provided to, in essence, subtract 10 from such signal and in the latter instance a circuit 66 is provided to add 10 to such signal for reasons well known in binary mathematics.

The circuit 35 comprises means for utilizing the input wave forms from the devices 33 and the correction constant stored in memory circuit 56 to detect which side of zero is being considered as determined by the relative positions of the index grating 12 with respect to scale grating 11. Electrical signals from the memory circuit 56 to the circuit 35 are provided through a line 56A.

The circuit 35 also has a portion 35A which is provided with suitable electrical logic means to change the sign as the relative position of the gratings passes through the zero position (also see FIG. 2) to generate either pulses 41 or 42 and introduce such pulses into the counter 40 through their associated channels to assure the counter counts either up or down in the correct manner.

The system 50 also has an electrical circuit 67 which, in essence, takes the 10's complement if the signal provided through a line 70 from portion 35A of circuit 35 is negative and the output from circuit 67 is provided to a standard electrical decoding circuit 73 which converts the signal from the binary system to the decimal system. The decoded signal is conveyed through a line or channel 74 to the portion 45 of the display unit 43 and displayed as a number. The signal through line 70 from circuit portion 35A is also provided through a line 75 to a portion 75A of the display unit 43 and indicated as either a + or − signal.

The apparatus and method of this invention enable the observation of a static condition of wave forms in order to determine the least significant digit of a particular reading or measurement. However, it is to be understood that the apparatus and method of this invention may be employed to determine not only the least significant digit but also one or more digits of a dimensional measurement, displacement, or the like.

In this disclosure a divide-by-10 electrical circuit has been employed as an integral part of the system. However, in some applications it may be desirable to provide electrical circuits which divide by greater or smaller numbers depending upon the accuracy of the system desired and in each instance suitable electrical circuits and components are chosen which are adapted to be used employing the principals of binary mathematics.

In this disclosure, gratings have been provided having grating lines thereon which utilize the moire fringe principal in order to provide a cyclic wave pattern. However, this invention is fully applicable in applications where a cyclic wave pattern is provided by any form of electromagnetic energy and the detection means and associated components employed are selected based on the form of energy employed. In addition, where light energy is employed suitable interferometers, such as of the Michelson type, laser type, etc., may be used in lieu of gratings to produce a cyclic wave pattern of light.

The apparatus and method of this invention have been shown and described using an index grating 12 which is movable with respect to a fixed reflective scale grating 11; however, the scale grating 11 may be a transmission grating, if desired. In addition this apparatus and method may be used in applications where the index grating and reading head are stationary and the scale grating is movable with respect thereto. Also, the cooperating gratings may have other configurations, such as scale gratings of cylindrical form, frustoconical form, circular form, etc., with the associated index grating being suitably modified in each instance. Similarly, in these other and similar configurations, the index grating may be kept stationary and the scale grating moved with respect thereto, as previously mentioned in connection with the gratings 11 and 12 which are supported for substantially rectilinear reciprocating movements.

This invention is preferably used in connection with a measuring machine whereby member or grating 11 may be suitably fixed on a support S of such a machine and reading head 13 with its grating 12 fixed on an associated slide member M; however, it will be appreciated that a fixed member may be provided on any other suitable machine, such as a machine tool, assembly machine, automatic drafting machine, automatic assembly machine, etc., with the cooperating movable member being provided on a relatively movable slide or component of such a machine and where it is necessary to precisely determine the position of an operating agency, or the like.

While present exemplary embodiments of this invention, and methods of practicing the same, have been illustrated and described, it will be recognized that this invention may be otherwise variously embodied and practiced within the scope of the following claims.

What is claimed is:

1. An apparatus for determining displacements comprising, a fixed member, a movable member, means providing a cylic wave pattern upon moving said movable member relative to said fixed member, a plurality of electric devices operatively associating with and detecting said pattern with each electric device providing a maximum magnitude electrical output signal during movement of a portion of said pattern completely past each electric device, and an electrical system receiving the electrical output signals from said electric devices and determining the direction of movement of said movable member and the extent of said movement, said system comprising means receiving the maximum magnitude electrical signals and converting said maximum magnitude signals to a digital readout which represents the major portion of said movement and electrical logic means providing the least significant portion of said movement in an absolute manner and independently of said major portion and converting said least significant portion to another digital readout which is combined with said first-named digital readout, said logic means observing the static condition of the wave forms which exist due to the extent of said movement and providing a corresponding electrical signal which ranges in magnitude between less than and equal to said maximum magnitude signal and is due solely to the static condition of the wave forms.

2. An apparatus as set forth in claim 1 in which said logic means comprises electrical circuitry which employs the principles of binary mathematics.

3. An apparatus as set forth in claim 2 in which said logic means comprises a decoder for converting a binary electrical input into an electrical output corresponding to a decimal number which defines said other digital readout.

4. An apparatus as set forth in claim 1 and further comprising preset means for providing an electrical correction signal to correct the combined digital readout and enable presetting any desired readout including zero readout with said movable member at any position relative to said fixed member.

5. An apparatus as set forth in claim 1 in which said providing means comprises means providing a cyclic wave pattern of light and said electric devices comprise electrooptical devices.

6. An apparatus as set forth in claim 5 in which said members comprise gratings having grating lines which cooperate to define a moire fringe pattern.

7. An apparatus as set forth in claim 6 in which one of said gratings comprises a reflective grating and the other of said gratings comprises a grating capable of transmitting light therethrough.

8. An apparatus as set forth in claim 6 in which each of said gratings is in the form of a light-transmitting grating.

9. A measuring apparatus comprising, a fixed grating, a movable grating, said gratings having grating lines thereon which cooperate to define a cyclic moire fringe pattern upon moving said movable grating relative to said fixed grating, a plurality of electrooptical devices operatively associating with and detecting said pattern with each electrooptical device providing a maximum magnitude electrical output signal during movement of a portion of said pattern completely past each electrooptical device, and an electrical system receiving the electrical output signals from said electrooptical devices and determining the direction of movement of said movable grating and the extent of said movement, said system comprising means receiving the maximum magnitude electrical signals and converting said maximum magnitude signals to a digital readout which represents the major portion of said movement and electrical logic means providing the least significant portion of said movement in an absolute manner and independently of said major portion, and converting said least significant portion to another digital readout which is combined with said first-named digital readout, said logic means observing the static condition of the wave forms which exist due to the extent of said movement and providing a corresponding electrical signal which ranges in magnitude between less than and equal to said maximum magnitude signal and is due solely to the static condition of the wave forms.

10. A measuring apparatus as set forth in claim 9 and further comprising preset means for providing an electrical correction signal to correct the combined digital readout and enable presetting any desired readout including zero readout while precisely determining the position of said movable member at any position relative to said fixed member.

11. A measuring apparatus as set forth in claim 9 in which said logic means comprises electrical circuitry which employs the principles of binary mathematics and a decoder for converting a binary electrical input to an electrical output corresponding to a decimal number which defines said least significant portion as said other digital readout.

12. A method of determining displacements comprising the steps of, providing a cyclic wave pattern upon moving a movable member relative to an associated fixed member, detecting said pattern with a plurality of associated electric devices with each electric device providing a maximum magnitude electrical output signal during movement of a portion of said pattern completely past each electric device, and operatively associating said electric devices with an electrical system which receives the electrical output signals from said electric devices and determines the direction of movement of said movable member and the extent of said movement, said system during said operatively associating step employing means receiving the maximum magnitude electrical signals and converting the maximum magnitude signals to a digital readout which represents the major portion of said movement and employing electrical logic means which provides the least significant portion of said movement in an absolute manner and independently of said major portion, and converting said least significant portion to another digital readout which is combined with said first-named digital readout, said logic means observing the static condition of the wave forms which exist due to the extent of said movement and providing a corresponding electrical signal which ranges in magnitude between less than and equal to said maximum magnitude signal and is due solely to the static condition of the wave forms.

13. A method as set forth in claim 12 in which said operatively associating step includes employing said logic means in the form of an electrical circuitry which employs the principles of binary mathematics.

14. A method as set forth in claim 13 and comprising the further step of presetting any desired readout including zero readout on the combined digital readout by providing a precise electrical signal input to said system with said movable member at any desired position relative to said fixed member.

15. A method as set forth in claim 13 in which said providing step comprises providing a cyclic wave pattern of light and said detecting step comprises detecting said wave pattern with a plurality of electrooptical devices.

16. A method as set forth in claim 13 in which said providing step comprises providing a cylic wave pattern of light using said members in the form of gratings having grating lines thereon to provide said cyclic wave pattern in the form of a moire fringe pattern and said detecting step comprises detecting said pattern with a plurality of electrooptical devices.

17. A method as set forth in claim 13 wherein said logic means provides the least significant portion of said movement by observing electrical signals in said substantially static condition which are defined as at least four roughly sinusoidal wave forms.

* * * * *